US007807946B2

(12) United States Patent
Darzi et al.

(10) Patent No.: US 7,807,946 B2
(45) Date of Patent: Oct. 5, 2010

(54) WORKPIECE CUTTING AND FREE BODY SCRAP COLLECTION SYSTEM

(75) Inventors: Ayad K. Darzi, Grand Blanc, MI (US); David P. Brooks, Flushing, MI (US); Raymond J. Roberts, Farmington, MI (US); Carol A. Terry-Davis, Fowlerville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 685 days.

(21) Appl. No.: 11/695,708

(22) Filed: Apr. 3, 2007

(65) Prior Publication Data

US 2008/0245201 A1 Oct. 9, 2008

(51) Int. Cl.
*B23K 26/02* (2006.01)

(52) U.S. Cl. ............................ 219/121.82; 219/121.7; 219/121.71

(58) Field of Classification Search ............ 219/121.82, 219/121.67, 121.84, 121.7, 121.71; 83/24, 83/453, 466

See application file for complete search history.

(56) References Cited

U.S. PATENT DOCUMENTS 3,833,786 A * 9/1974 Brucker .................. 219/121.7
4,950,861 A * 8/1990 Erlenmaier et al. .... 219/121.67
4,973,813 A * 11/1990 Mitchell ..................... 219/109
5,456,559 A * 10/1995 Taylor ........................ 409/137
5,585,015 A * 12/1996 Hayashi et al. ........ 219/121.67
6,437,286 B1 * 8/2002 Scott ..................... 219/121.82
6,893,549 B2 * 5/2005 Chou et al. .................. 205/93

FOREIGN PATENT DOCUMENTS

DE 9306589 U1 7/1993
JP 2000024852 A * 1/2000

* cited by examiner

*Primary Examiner*—Tu B Hoang
*Assistant Examiner*—John Wasaff

(57) ABSTRACT

A system (20) adapted for securing a hollow workpiece (22) in a fixed position, for cutting at least one portion of the workpiece (22) to produce a free body scrap (24), and for collecting and conveying the scrap (24) to a predetermined destination away from the interior space defined by the workpiece (22), wherein said system (20) includes a cutting device (26), a base plate (36), and at least one clamp (30), a collecting and conveying conduit (32) having a tube (42), ejector (44), and biasing mechanism (48) for biasing the tube (42) towards a first inlet position, and a bin (34) for receiving the scrap (24), and more preferably also includes an air pressure device (38) for directing the scrap (24) towards the conduit (32).

12 Claims, 9 Drawing Sheets

WORKPIECE CUTTING AND FREE BODY SCRAP COLLECTION SYSTEM

BACKGROUND OF THE INVENTION

1. Field of the Invention

The present invention pertains generally to manufacturing processes involving cutting systems, and more particularly to a system for cooperatively cutting a workpiece, and collecting the free body scraps produced therefrom.

2. Discussion of Prior Art

The production of scraps (i.e., by product material that would otherwise be discarded) during manufactured cutting processes involving generally hollow workpieces have long presented various concerns. Of particular relevance to this invention, is the need to prevent a scrap from becoming trapped within the interior space defined by the subject workpiece. If this happens, and the scrap becomes unintentionally incorporated within the finished product, it is likely to result in a nuisance, thereby rendering the product less appealing.

In automotive manufacturing, for example, this concern is increasingly magnified as autobody components, including deck lids 10 (FIG. 1), become more commonly formed of hollow workpieces, so as to reduce vehicular weight. More particularly, to construct a deck lid 10, two or more flatwork parts 12, 14 are typically hemmed together along their perimeters and spaced interstitially, so as to cooperatively define a pocket or interior space. The innermost part 12 further defines a plurality of cut-outs that allows access to the pocket and further reduces weight. Previously, where the addition of a rear spoiler 16 was desired, at least the outermost part 14 of the deck lid 10 had to be separately cut to accommodate a plurality of spoiler fasteners 18, prior to aligning and hemming the parts, and then mounting the spoiler 16. This was a long and inefficient process that resulted in voluminous inventory backup as vehicles were unable to be completed due to the variability of spoiler addition.

More recently, processes have been developed that enable the spoiler 16 to be added after the deck lid 10 has been hemmed and finished. In these processes, the deck lid 10 is manipulated and cut to accommodate the spoiler fasteners 18 as a unit. Magnets are then utilized to retrieve the loose scraps that fell within the interior space of the deck lid 10. Although labor intensive and subject to failure due to heat exposure, magnetic collection processes have generally proven to be successful with respect to steel deck lids. However, their usage is ineffective where the deck lid 10 is formed of aluminum or a high grade plastic. As the later weight-saving materials become increasingly utilized the efficiency of magnet usage decreases.

As a result, there remains a need in the manufacturing arts for a universally effective system that prevents the free body scraps produced during the cutting of a hollow workpiece from becoming incorporated within the product.

BRIEF SUMMARY OF THE INVENTION

Responsive to this need, the present invention provides a system adapted for securing in a fixed position a hollow workpiece formed of an exterior member and at least one interior member that cooperatively define an interior space, cutting the exterior member of the workpiece to produce a free body scrap, and collecting and conveying the scrap to a predetermined destination away from the interior space.

The inventive system generally includes at least one clamp configured to directly engage and secure the workpiece in the fixed position, and a cutting device configured to engage and cut a portion of the workpiece, so as to produce the scrap. At least one inventive conduit is also included, wherein each conduit defines an interior space having a minimum lateral diameter greater than the maximum diameter of the scrap, an inlet positionable generally adjacent an interior surface of the workpiece so that the scrap enters the inlet once cut, and an outlet. At least one receiving bin is dimensioned and positioned relative to the outlet so that the scrap is receivable by the bin after the scrap enters the inlet. Finally, a base is provided to fixedly interconnect said at least one clamp, conduit, and bin.

The benefits of this invention, therefore, include providing a system that prevents the scrap from being trapped in-between the layers of the workpiece, and is effective with workpieces of all materials, including aluminum, plastics, and steel. The inventive system is further useful for providing a cutting and scrap collection process that requires little or no maintenance, and no extra electrical or magnetic components or controls to remove the scraps. Finally, the system is useful for reducing manual labor and machine down-time, so as to provide a faster, more flexible, and efficient manufacturing process in comparison to prior art cutting and scrap collection processes.

Other aspects, embodiments, and advantages of the present invention will be apparent from the following detailed description of the preferred embodiment(s) and the accompanying drawing figures.

BRIEF DESCRIPTION OF THE SEVERAL VIEWS OF THE DRAWING

A preferred embodiment(s) of the invention is described in detail below with reference to the attached drawing figures, wherein.

DETAILED DESCRIPTION OF THE INVENTION

Figure 1:
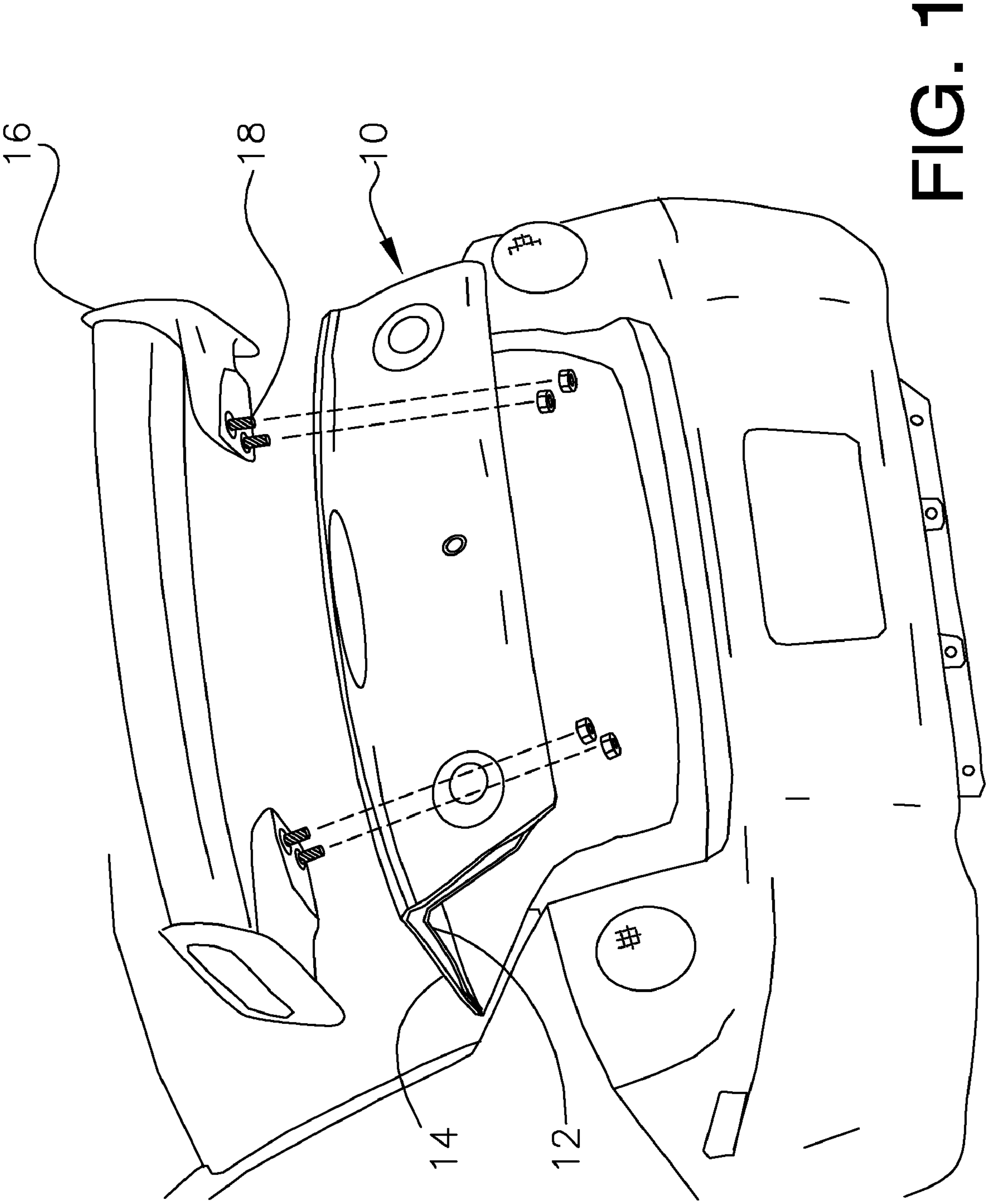
FIG. 1 is a perspective view of the rear of a vehicle including an exploded deck lid and rear spoiler assembly.
Figure 2:
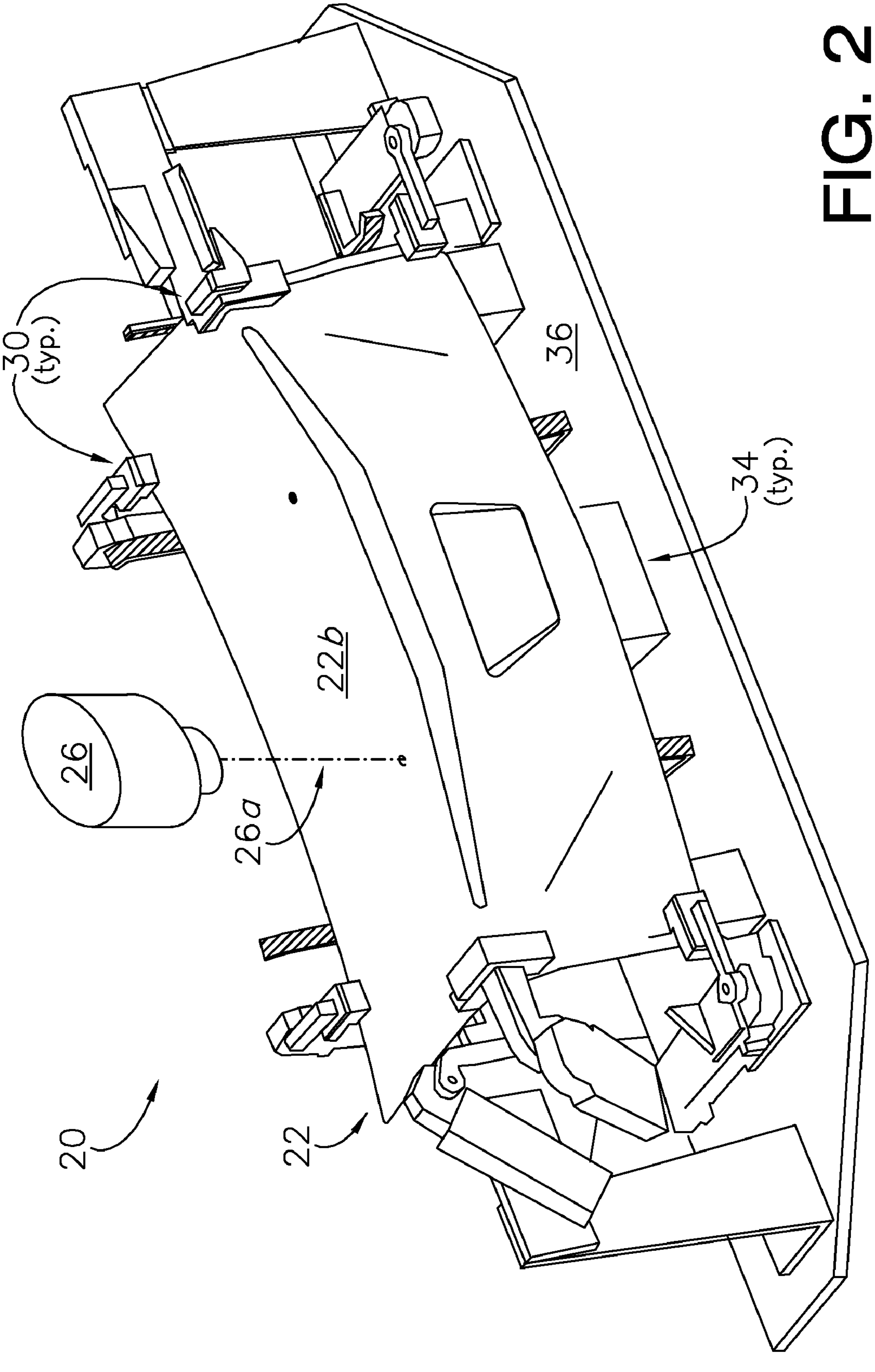
FIG. 2 is a perspective view of the assembly in accordance with a preferred embodiment of the present invention, particularly illustrating six clamps, supporting structure, three receiver bins, a plurality of stops, a base plate, a laser cutting device, and a deck lid workpiece.
Figure 3:
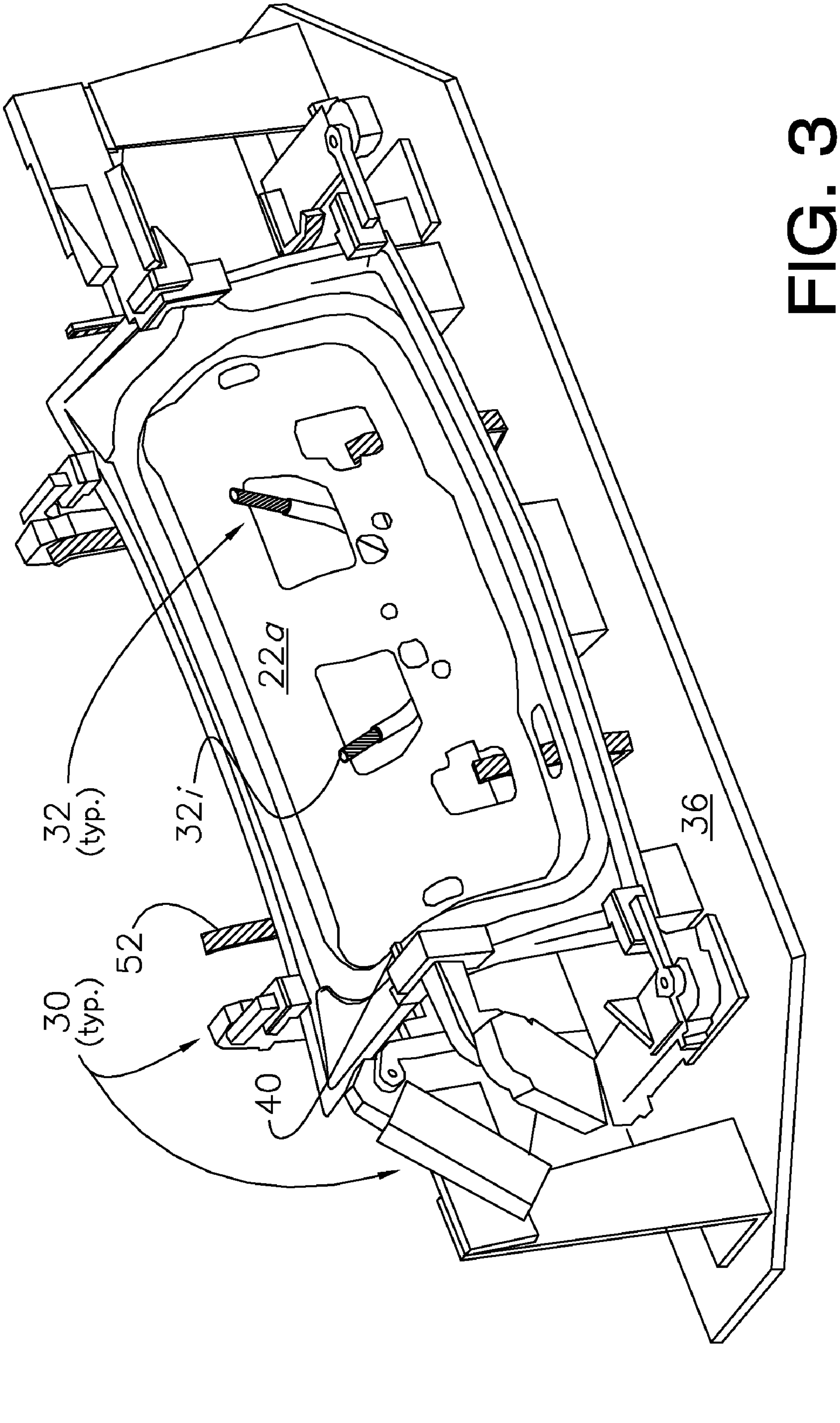
FIG. 3 is a perspective view of the assembly shown in FIG. 2 with the outer member of the deck lid removed, so as to further illustrate two scrap collecting conduits protruding through cut-outs defined by a first member (or interior part) of the deck lid workpiece.
Figure 4:
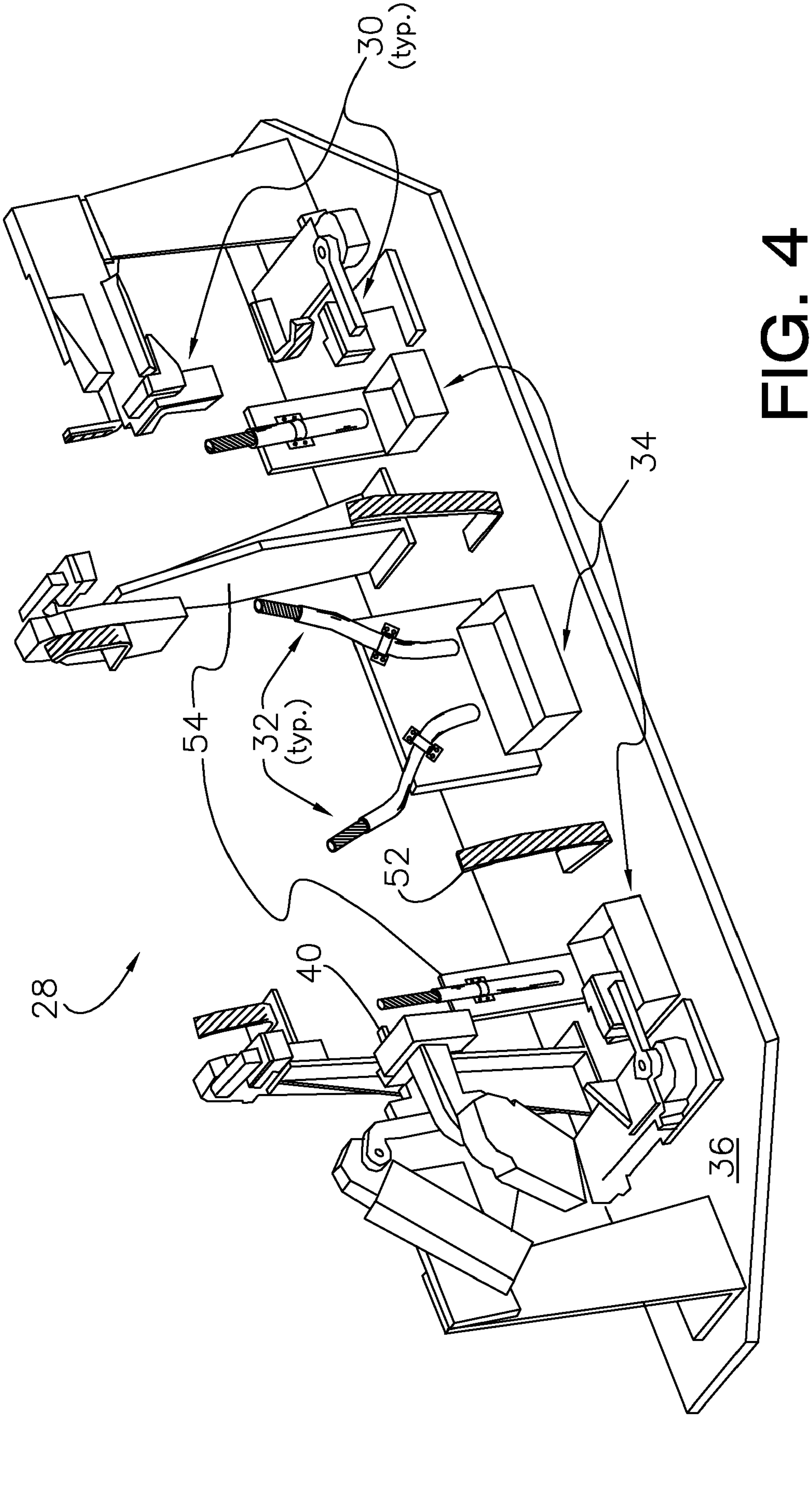
FIG. 4 is a perspective view of the assembly shown in FIGS. 2 and 3, further adding two outer straight conduits to complete a four hole cutting assembly.

The present invention concerns a system 20 adapted for securing a workpiece 22 in a fixed position, for cutting at least one portion of the workpiece 22 to produce a free body scrap (or slug) 24, and for immediately collecting and conveying the scrap 24 to a predetermined destination away from the workpiece 22 (FIGS. 2 through 4).

As used herein the term "scrap" includes chips, cuttings, fragments, or other small pieces of raw material removed, cut away, flaked off, etc., in the process of making or manufacturing an item. The system 20 is illustrated and described herein with respect to a deck lid workpiece 22 (i.e., rear compartment or trunk lid); however, it is appreciated by those of ordinary skill in the art that the innovative aspects of the system 20 may also be utilized with other hollow workpiece configurations, or wherever it is desirous to collect scraps produced in a cutting process, by changing the structural configuration of the system 20.

Figure 3A:
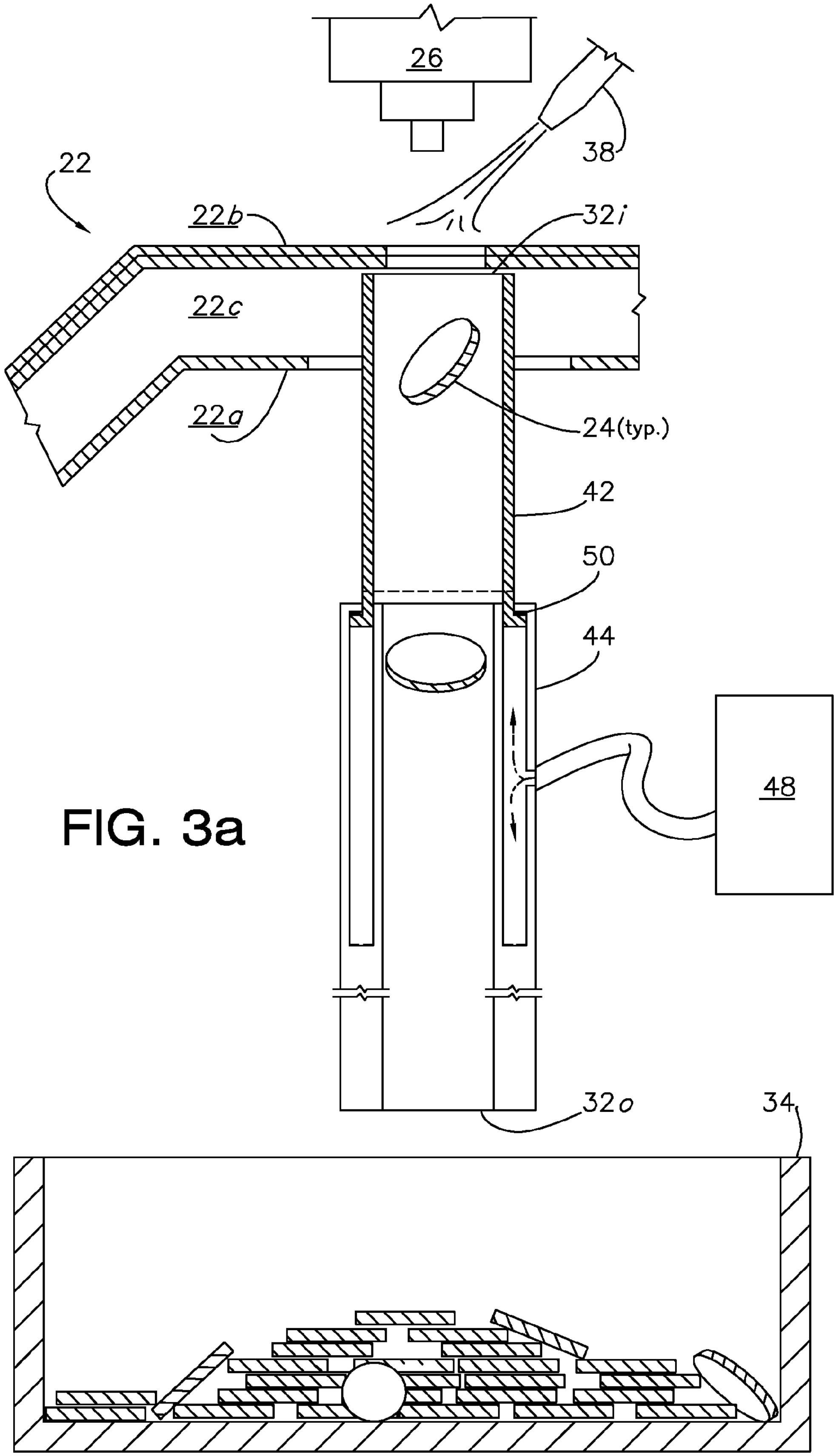
FIG. 3*a* is a cross-section of a partial view of a laser cutting device, a hollow workpiece having a double member outer layer, and an assembly in accordance with a preferred embodiment of the invention, particularly illustrating a conduit having a retractable tube defining an inlet in a first inlet location (and in a retracted inlet location shown by hidden line type), an ejector, and a pneumatic biasing mechanism (generally), and further illustrating two falling scraps, and a receiving bin.

As best shown in FIG. 3*a*, the preferred workpiece 22 for use with the present invention preferably presents first (i.e., inner) and second (i.e., outer) planar members 22*a,b* hemmed together at or near their perimeters and cooperatively configured to define an interior space 22*c*. The second member 22*b* defines opposite interior and exterior surfaces, and the first member 22*a* defines at least one cut-out that enables access to the interior space 22*c* and the interior surface of the second member 22*b*. However, the workpiece 22 may also present a monolithic structure wherein the first and second members are integrally formed.

In general, the system 20 includes a conventional cutting device 26 and an innovative assembly (or fixture) 28 (FIG. 4). By oppositely engaging the same portion(s) of the workpiece 22, the device 26 and assembly 28 are cooperatively configured to effect the intended benefits of the invention. As shown in FIG. 2, the assembly 28 includes at least one clamp 30 for securing the workpiece 22, at least one tubular conduit 32 for catching or collecting the scrap 24 so that it does not become trapped within the interior space of the workpiece 22 (FIG. 3), at least one receiving bin 34 for receiving the scrap 24 from the conduit 32, and a base plate 36 for fixedly interconnecting said at least one clamp 30, conduit 32, and receiving bin 34.

More particularly, once the workpiece 22 has been secured in the fixed position, the cutting device 26 is configured to engage and cut a predetermined portion of the workpiece 22, so as to produce an opening therein and the scrap 24 (FIG. 3*a*). It is appreciated that the scrap 24 may also be produced by tapping, shearing, punching, or shaving, as said processes also result in by-product fragmentation. More preferably, the cutting device 26 is configured to cut a plurality of portions of the workpiece 22, so as to produce a plurality of fastener receiving openings and scraps 24, either concurrently or in sequence during a single cycle.

As shown in FIGS. 2 and 3*a*, the preferred cutting device 26 includes a laser that is programmably configured to cut either a single or multiple sheets of the workpiece 22 as desired. More particularly, the laser 26 produces a laser beam 26*a* that traces the shape of the cut at the predetermined location based upon the product design. With respect to deck lids, for example, a plurality of 18 mm circular cuts are typically produced at equal spacing along the would be footprint of the spoiler. It is well within the ambit of the invention, however, to utilize other cutting devices, such as an electro-mechanical, or a hydro based device.

With further respect to the cutting device 26, the system 20 includes preferred process parameters (e.g., laser power, speed, gas pressure, and beam quality) for producing clean cuts with or without an air gap within outer members comprising multiple sheets of metal, so as to cause no heat distortion to the exterior surface of the deck lid workpiece.

In a preferred embodiment of the invention, an air pressure/flow device 38 is also included to direct the scrap 24 towards the conduit 32. More particularly, the air pressure device 38 is configured to produce a modified air pressure at or near the portion of the workpiece to be cut, so that the scrap 24 travels towards an inlet 32*i* defined and is collected by the conduit 32. It is appreciated that the air pressure may be negative or positive. In a negative embodiment the conduit 32 and air pressure device 38 are both positioned opposite the cutting device 26 and preferably combined so as to present a vacuum nozzle that pulls (or sucks) the scrap 24 towards the inlet 32*i*.

As shown in FIG. 3*a*, however, the system 20 more preferably includes a positive air pressure device (i.e., blower) 38 configured to engage the exterior surface of the second member 22*b*. The increased air pressure pushes the scrap 24 into the inlet 32*i* and down the longitudinal length of the conduit 32. In the blower configuration, the air pressure device 38 preferably produces a continuous stream of air, or more preferably, a gaseous stream that also promotes the cutting process or improves the quality of the cut. Where a laser 26 is utilized, the air pressure device 38 is more preferably concentrically aligned with the laser 26 so that the gaseous stream is further able to envelop and promote the function of the laser beam 26*a*. In this configuration it is appreciated that the air pressure device 38 enables the required laser power output to be reduced as the gaseous stream also works to separate the scrap 24 from the workpiece 22.

Finally, the preferred cutting device 26 is communicatively coupled to the assembly 28 and configured to receive notification of proper conduit and workpiece positioning prior to initiating the cut. In a preferred embodiment, at least one sensor 40 (e.g., a proximity switch near the inlet 32*i*) is included and configured to detect when the workpiece 22 is in the fixed position and/or the inlet 32*i* is at a pre-determined first inlet location. The sensor 40 and laser cutting device 26 are therefore either wirelessly coupled or connected by land wire as part of communication network. In either configuration, the preferred system 20 is programmably adjustable and further configured to provided feedback control to effect optimal performance of the cutting device 26 and/or positioning of the inlet 32*i*.

Figure 5:
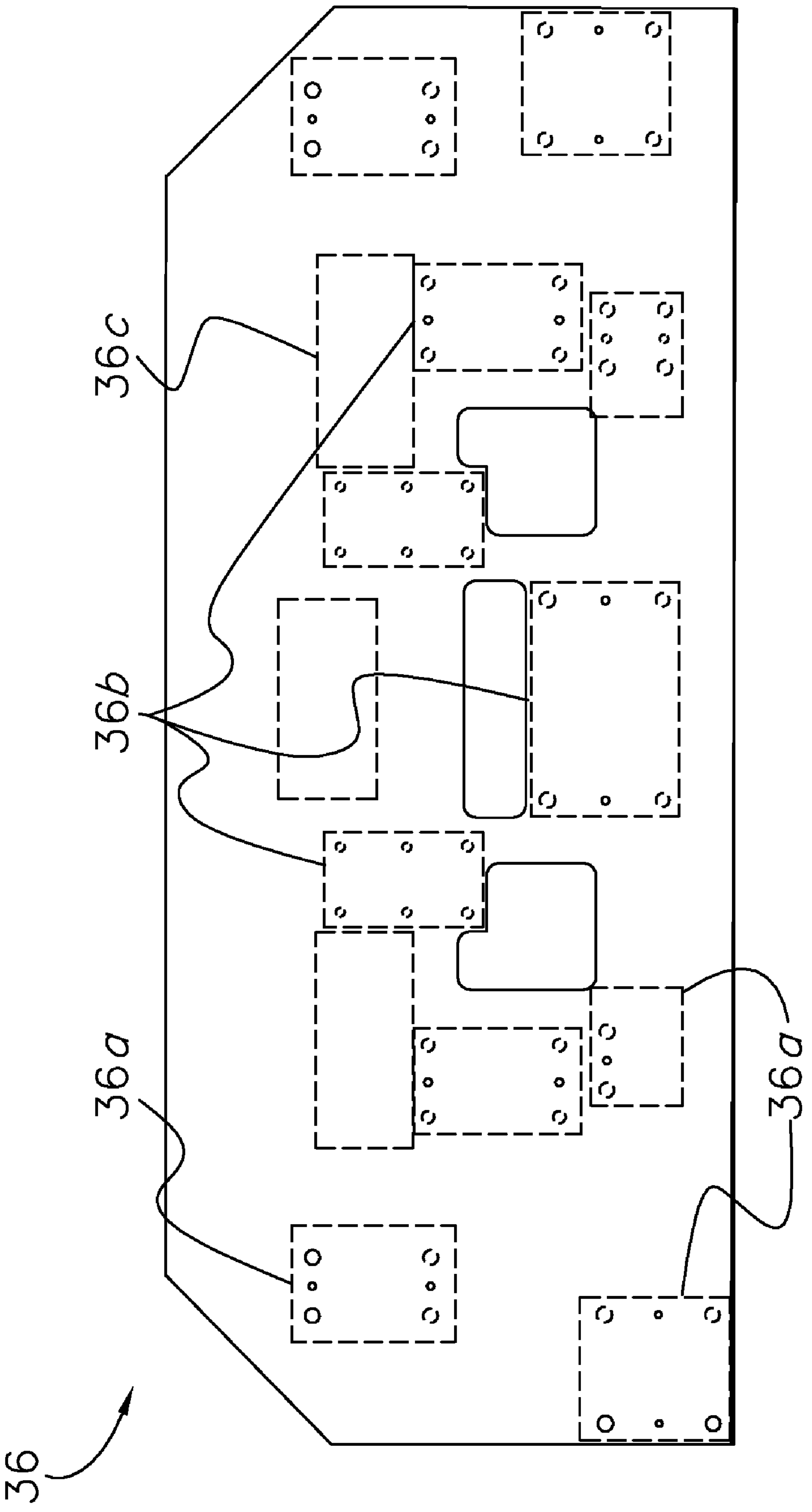
FIG. 5 is a top view of a base plate in accordance with a preferred embodiment of the invention, particularly illustrating mounting surfaces for engaging the assembly components.
Figure 6:
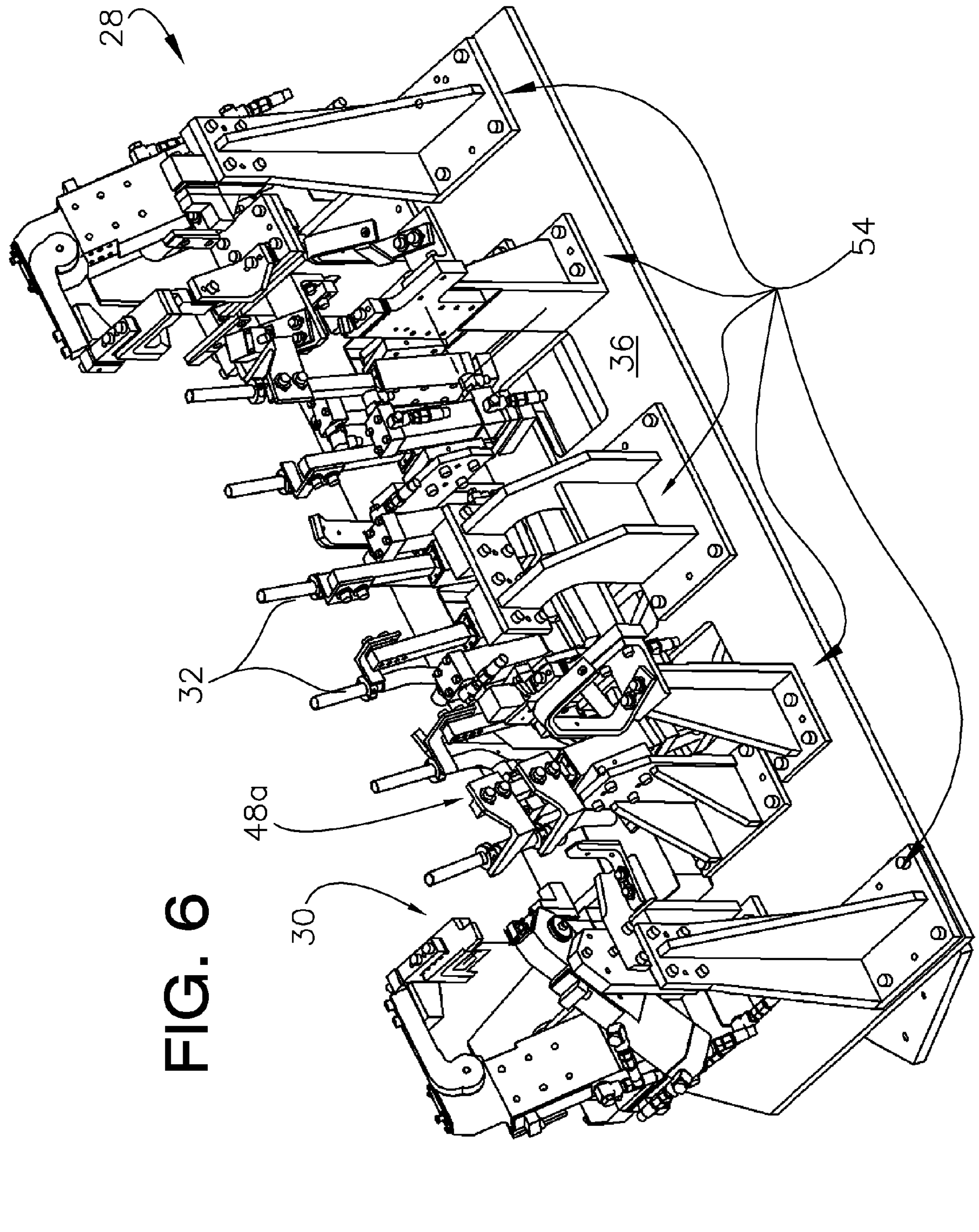
FIG. 6 is a rear perspective view of an assembly shown in FIG. 2, particularly illustrating six conduits, a preferred embodiment of the support structure in greater detail, and six air-solenoids (biasing mechanisms) mechanically coupled to the conduits.
Figure 6A:
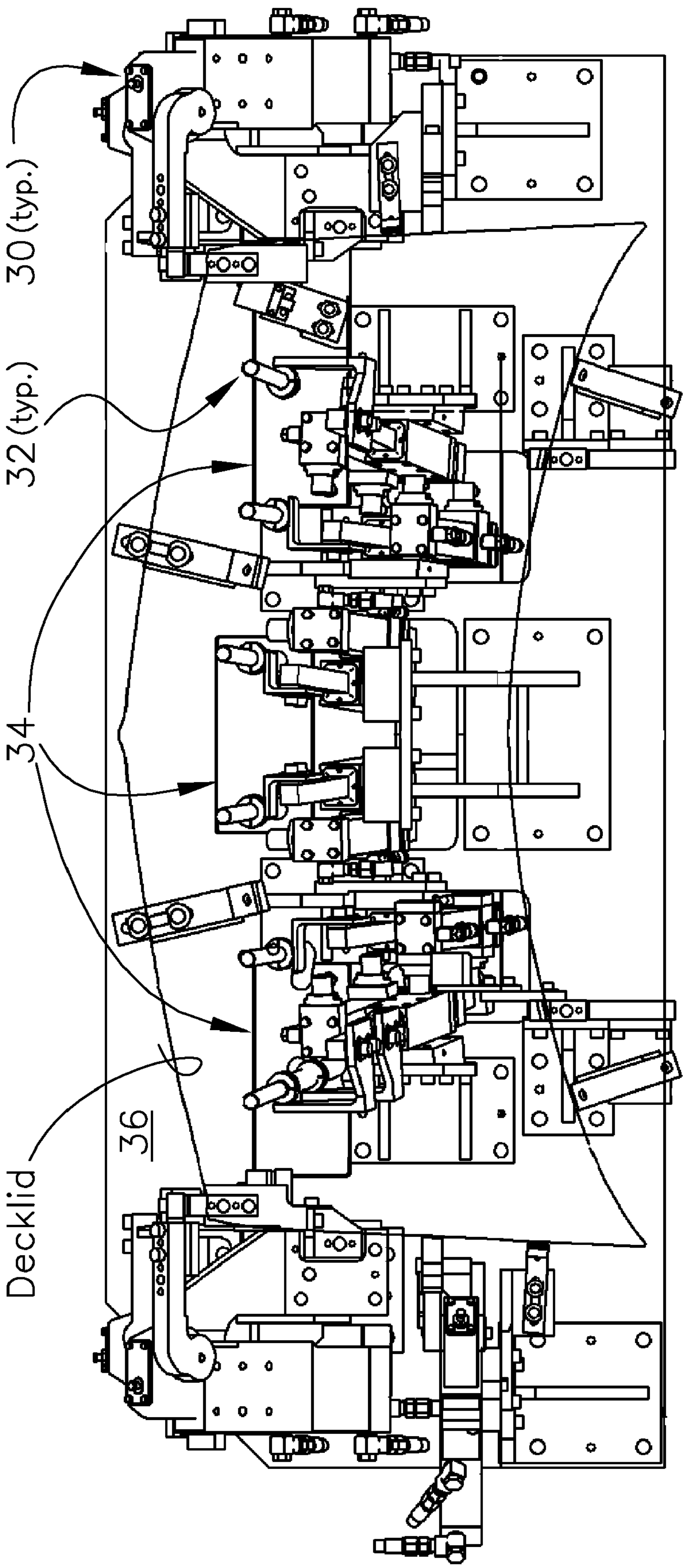
FIG. 6*a* is a top view of the assembly shown in FIG. 6, and a superimposed deck lid outline.

Turning to the configuration of the assembly 28, FIGS. 4 through 6*a* provide complete views of preferred embodiments of the assembly 20, with FIGS. 6 and 6*a* providing greater structural detail. As shown throughout the illustrated embodiments, at least one clamp 30 is configured to directly engage and secure the workpiece 22 in the fixed position. A singular robotic flex-clamp may be utilized, where it is appreciated that such an embodiment would enable freedom of movement and adjustment along three axis. More preferably, however, a plurality of (e.g., six) standard clamps 30 are included, as shown in FIG. 2 to cooperatively secure the workpiece 22. It is appreciated that the standard clamps 30 are lighter and therefore more amenable to incorporation within the system 20. It is also more preferable to provide adjustment mechanisms at each clamp 30 that enables the linear translation of the clamp along at least one axis degree of freedom, so as to be able to engage and secure a plurality of workpieces having differing dimensions.

A congruent number of conduits 32 are provided according to the number of portions of the workpiece 22 to be cut. In the illustrated embodiment shown in FIGS. 2, 3, and 4, it is appreciated that two cuts are to be made, since two conduits 32 are included. Similar to the pre-programming of the device 26, the conduits 32 are pre-manufactured and configured, and their proper positions are pre-determined according to the product design. As such, once in place, it is appreciated that the conduits 32 are further able to serve as locators for properly positioning the workpiece 22.

Figure 3B:
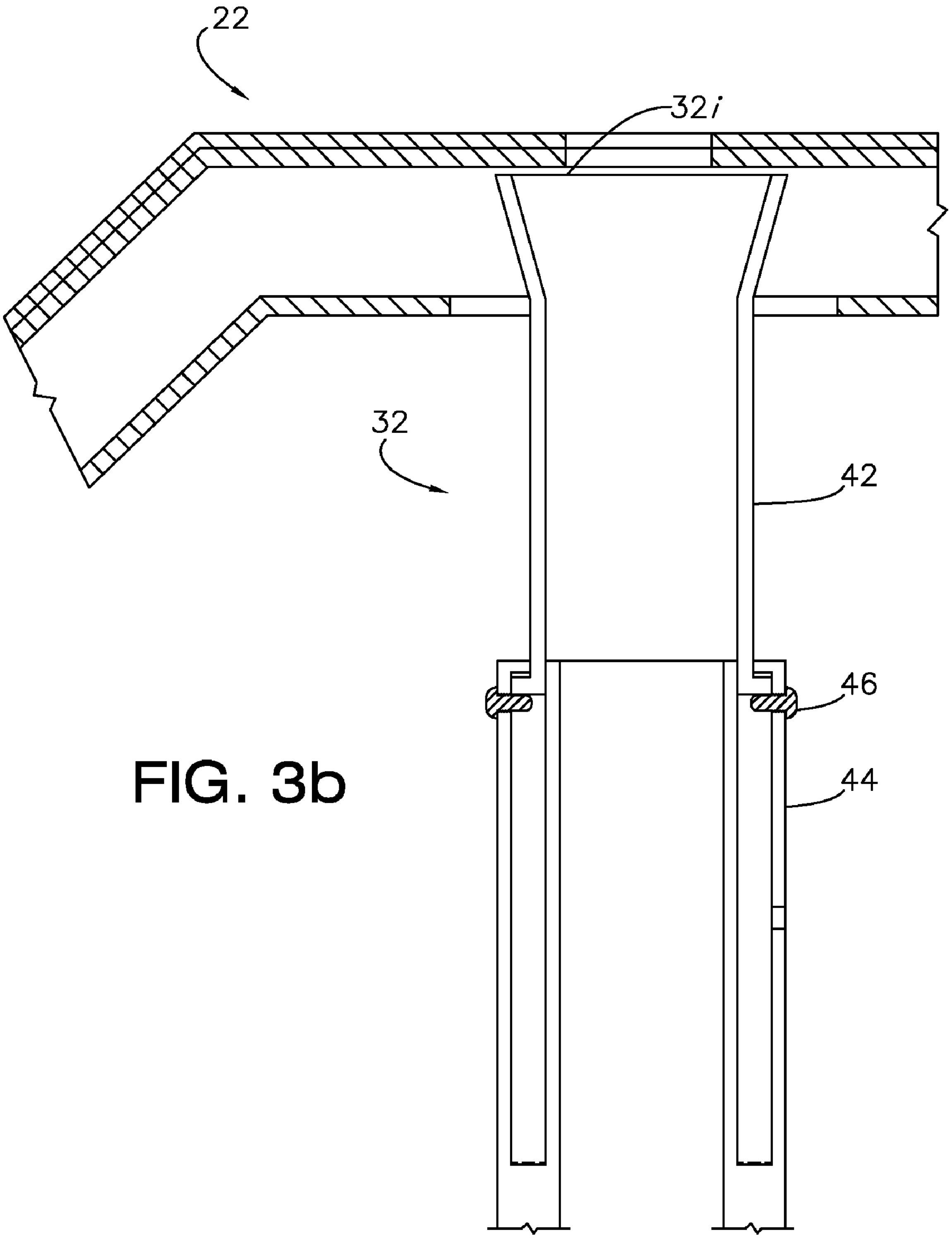
FIG. 3*b* is a cross-section of an alternative embodiment of the conduit shown in FIG. 3, wherein a funnel section is presented at the inlet, and a holding element (two screws) is used to further secure the tube.

Each conduit 32 defines an interior space having a minimum cross-sectional diameter greater than the maximum diameter of the scrap 24 (FIG. 3*a*). For example where the scrap 24 is anticipated to have a maximum diameter of 18 mm, including a factor of safety, the conduit 32 preferably defines a minimum cross-sectional diameter of 20 mm and more preferably 24 mm. In an alternative embodiment, the conduit 32 at the inlet 32*i* further presents a funnel section having a greater cross-sectional diameter than the remainder of the conduit (FIG. 3*b*), so as to further facilitate the initial collection of the scrap 24.

Each conduit 32 is preferably configured and positioned so that the inlet 32*i* is positioned generally adjacent (i.e., within a 5 mm, and more preferably within a 1 mm maximum spacing) the interior surface of the outer or second member 22*b* of the workpiece to be cut (FIG. 3*a,b*). More preferably, the inlet 32*i* is brought to bear against the member 22*b*, so as to further ensure that the scrap 24 enters the inlet 32*i*. In this configuration, the minimum cross-sectional diameter is further configured to enable, and the conduit is formed of material suitably exposable to the cutting process. For example, where laser cutting is utilized, the conduit 32 is preferably formed of copper or an equivalently non-fusible material.

As best shown in FIGS. 3, and 3*a* the cut-outs defined by the first member 22*a* and conduit 32 are cooperatively configured so that a portion of the conduit 32 is inserted through a cut-out opening when the workpiece 22 is in the fixed position. Where the cut-outs do not linearly coincide with the portions of the second member 22*b* to be cut, it is appreciated that sinuous conduit configurations (FIG. 3) may be necessary, and in some instances, that positioning the conduit 32 after the workpiece 22 is in the fixed position may be required. More preferably, the conduits 32 are adjustable, so as to be able to reposition the inlet 32*i* to a second inlet location or change the longitudinal configuration thereof without detaching the conduit 32 from the base plate 36. For example, at least a portion of the conduit 32 may be formed of flexibly rigid material (such as copper tubing), so as to be manually bendable into a plurality of differing longitudinal configurations.

As best shown in FIG. 3*a*, the preferred conduit 32 further comprises a separate tube 42 and an ejector 44 fixedly attached to the base 36. The ejector 44 is coaxially aligned and telescopingly coupled to the tube 42, so that the inlet 32*i*, as defined by the tube 42, is incrementally and more preferably continually translatable between the first and a retracted inlet location. This configuration, it is appreciated, enables manual adjustment of the first inlet location along the longitudinal axis defined by the conduit 32. In this configuration, a holding element 46 is preferably provided to hold the tube 42 in place. More preferably, the tube 42 is autonomously translatable by a drive mechanism (not shown) that causes the tube 42 to translate. For example, an electro-mechanical drive can be coupled to the tube 42.

Alternatively, the tube 42 may be caused to translate to the first inlet location and from the retracted location by a biasing mechanism 48 drivingly coupled to the tube 42. The biasing mechanism maintains a constantly applied force so that the tube 42 is biased towards the first inlet location. In the illustrated embodiment shown in FIG. 3*a*, the biasing mechanism 48 includes a volume of pressurized air at least partially housed by the tube 42 and ejector 44, so as to cooperatively form an air cylinder. In this configuration, the ejector 44 defines a release port configured to release air as the tube is retracted towards the ejector 44, and the applied force is configured so that the tube retracts but constant contact is maintained where the tube is brought to bear against the workpiece 22. More preferably, a return mechanism (e.g., a spring fixedly connected to the base of the tube 42) 50 is also included and operable to cause the tube 42 to retract when the biasing force is suspended, so as to facilitate removal of the workpiece 22 from the assembly 28.

In the illustrated embodiment shown in FIGS. 6 and 6*a*, an alternative pneumatic biasing mechanism is provided, wherein each conduit 32 is drivenly coupled to an air-solenoid 48*a*. More particularly, the plunger of the air-solenoid 48*a* is fixedly connected through a stirrup to the tube 42, and the fixed portion of the solenoid 48*a* is coupled to the ejector 44, so that the tube 42 and plunger 48 moves in unison.

Finally, the preferred conduit 32 further defines an open outlet 32*o* opposite the inlet 32*i*. At least one receiving bin 34 is dimensioned and positioned relative to each outlet 32*o* so that the scrap 24 is receivable by the bin 34 after it is caused to travel down the longitudinal length of the conduit 32. It is appreciated that the open outlet 32*o* enables viewing of the collection process by an operator, and therefore early determination of clogging or back-up. It is within the ambit of the invention to provide an integral structure comprising the conduit 32 and bin 34; however, it is also appreciated that having a separate conduit 32 and bin 34 enables scrap 24 disposal without having to disconnect the conduit 32 from the plate 36.

As previously mentioned, the base plate 36 fixedly interconnects said at least one clamp 30, conduit 32, and bin 34. The preferred plate 36 defines a plurality of mounting surfaces 36*a,b,c* for engaging each component respectively (FIG. 5). Each mounting surface preferably defines at least one fastener receiving hole to provide removable connectability to the plate 36. This enables differing pluralities of conduits 32, and bins 34 to be utilized (compare FIGS. 4 and 6). The base plate 36 is preferably fixedly attached to a turn table (not shown) having, as is typical, a stationary support member and a planar member rotatably coupled to the support member. It is appreciated that this configuration facilitates mounting and removal of the finished cut workpiece 22, and/or usage of the assembly 28 with a plurality of stationary cutting devices 26 radially spaced from the center of the table.

Finally, as best shown in FIGS. 4, 6, and 6*a*, a plurality of stops 52 and additional structural support members 54 are included in the preferred assembly 28 as are needed to enable the proper function of the clamps 30, conduits 32, and biasing mechanisms 48. The stops 52 serve to facilitate the proper positioning of the workpiece 22, and the structural support members 54 further facilitate removable interconnection of the components to the base plate 36 by defining pluralities of fastener receiving holes (not shown) that are alignable with those defined by their corresponding matching mounting surface (FIG. 5).

The preferred forms of the invention described above are to be used as illustration only, and should not be utilized in a limiting sense in interpreting the scope of the general inventive concept. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. An assembly adapted for securing a hollow workpiece having inner and outer members that define an interior space therebetween that is accessible through an access opening in the inner member; cutting a hole in the outer member to thereby produce a free body scrap having a maximum lateral diameter, and for collecting and conveying the scrap to a predetermined destination, said assembly comprising:

a base;

at least one clamp configured to directly engage and secure the workpiece in a fixed position on the base in which the outer member is spaced above the inner member;

an ejector tube fixed on the base away from the workpiece and conveying the scrap to the predetermined destination;

a laser cutting device for cutting the hole in outer member and thereby making a piece of falling scrap that falls into the interior space between the outer member and the inner member of the hollow workpiece;

and an inlet tube defining an interior tube space having a minimum lateral diameter greater than the maximum lateral diameter of the scrap, said inlet tube being telescopically mounted on the ejector tube for movement of the inlet tube from a retracted position in which the inlet tube is spaced away from the workpiece to a first inlet position in which the inlet tube has moved through the access opening in the inner member and into the interior space between the outer and inner members and directly underlies the outer member in readiness to receive the falling scrap into the inlet tube and prevent the scrap from remaining in the interior space between the outer and inner members of the hollow workpiece.

2. The assembly as claimed in claim 1, wherein the outer member has opposite exterior and interior surfaces, and the inlet tube is configured and positioned such that the inlet tube contacts the interior surface when the workpiece is in the fixed position and the inlet tube is in the first inlet position.

3. The assembly as claimed in claim 1, wherein the predetermined destination to which the scrap is conveyed is a bin positioned at the ejector tube.

4. The assembly as claimed in claim 1, further comprising:

a biasing mechanism drivingly coupled to the inlet tube and configured to bias the inlet tube towards the first inlet location.

5. The assembly as claimed in claim 4, wherein the inlet tube and ejector tube cooperatively house a volume of pressurized air so as to form an air cylinder for moving the inlet tube from the retracted position away from the workpiece to the first inlet position in which the inlet tube extends through the access opening.

6. The assembly as claimed in claim 4, wherein the inlet tube and ejector tube are drivenly coupled to an air-solenoid having a translatable plunger for moving the inlet tube from a retracted position away from the workpiece to a first inlet position in which the inlet tube extends through the access opening.

7. The assembly as claimed in claim 1, wherein a plurality of clamps are cooperatively configured to engage and secure the workpiece in the fixed position, and said clamps each include an adjusting mechanism so as to be able to engage and secure a plurality of workpieces having differing dimensions in a fixed position.

8. The assembly as claimed in claim 1 wherein said laser cutting device is a laser programmably configured to produce a laser beam that engages the workpiece.

9. The assembly as claimed in claim 8 wherein said laser cutting device is configured to cut a plurality of holes in the workpiece so as to produce a plurality of free body scraps, and a plurality of inlet tubes are positioned such that an inlet tube is generally adjacent each of the locations where a hole will be made by the laser cutting device when the workpiece is in the fixed position.

10. The assembly as claimed in claim 1 further comprising:

an air pressure device configured to produce a modified air pressure at or near the locations where a hole will be made by the cutting device, said inlet tube laser cutting device and air pressure device being cooperatively configured and oriented such that the modified air pressure causes the scrap to travel towards the inlet tube.

11. The assembly as claimed in claim 10, wherein the air pressure device is configured to produce a gaseous stream and direct the stream against the scrap and towards the inlet tube so that the scrap is caused to enter the inlet by the stream.

12. The assembly as claimed in claim 1 further comprising:

at least one sensor configured to detect when the workpiece is in the fixed position and the inlet tube is in the first inlet location, said at least one sensor being communicatively coupled to the laser cutting device and configured to deliver to the device a notification signal when the workpiece is in the fixed position and the inlet tube is in the first inlet location, said laser cutting device being further configured to cut only after receiving the notification.

* * * * *